United States Patent
Yamagishi et al.

(10) Patent No.: US 6,954,939 B2
(45) Date of Patent: Oct. 11, 2005

(54) RECORDING MEDIUM LOADER

(75) Inventors: Hiromasa Yamagishi, Ikoma (JP); Toru Omosako, Yao (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 174 days.

(21) Appl. No.: 10/686,675

(22) Filed: Oct. 17, 2003

(65) Prior Publication Data

US 2004/0081055 A1 Apr. 29, 2004

(30) Foreign Application Priority Data

Oct. 21, 2002 (JP) ........................................ 2002-305267

(51) Int. Cl.[7] .............................................. G11B 17/03
(52) U.S. Cl. ..................................................... 720/635
(58) Field of Search ................................ 720/633, 635; 369/77.11, 77.21, 75.11, 75.21, 192, 178.01; 360/99.02, 99.06

(56) References Cited

U.S. PATENT DOCUMENTS 5,995,469 A * 11/1999 Uwabo et al. .............. 720/635
6,188,661 B1 * 2/2001 Arai et al. .................. 720/635
6,529,462 B1 * 3/2003 Kurozuka et al. .......... 720/641
2001/0050897 A1 * 12/2001 Takai .......................... 369/192

FOREIGN PATENT DOCUMENTS

JP                7-244711           9/1995

* cited by examiner

*Primary Examiner*—Allen Cao
(74) *Attorney, Agent, or Firm*—Armstrong, Kratz, Quintos, Hanson & Brooks, LLP

(57) ABSTRACT

An inventive recording medium loader includes a connector provided on a chassis for engagement with a front edge of a generally rectangular planar recording medium, and a tray provided on the chassis for transporting the recording medium toward and away from the connector. An engagement piece having a claw to be brought into and out of engagement with a notch formed in the recording medium is provided on the tray, and a cam is provided in an engagement piece movement path on the chassis. Before the forward edge of the recording medium is engaged with the connector, the claw is brought into engagement with the notch of the recording medium by the cam to lock the recording medium on the tray. In this state, the recording medium is brought into engagement with the connector.

11 Claims, 10 Drawing Sheets

RECORDING MEDIUM LOADER

FIELD OF THE INVENTION

The present invention relates to a recording medium loader which is capable of automatically inserting a recording medium into a recorder or player apparatus by means of a tray and engaging the recording medium with a connector provided in the apparatus.

BACKGROUND OF THE INVENTION

FIGS. 15A and 15B are plan views schematically illustrating a loader which is adapted to automatically insert an IC card as a recording medium 7 into a recorder or player apparatus (see Japanese Unexamined Patent Publication No. HEI7-244711 (1995)).

It is herein assumed that the recording medium 7 is inserted toward the front side and withdrawn toward the rear side.

The recording medium 7 includes a first connector 71 provided on a front edge thereof. The apparatus includes a second connector 2 provided on a front edge of a chassis 1 thereof for engagement with the first connector 71.

A main tray 8 and an auxiliary tray 81 are provided in association with the chassis 1, and the auxiliary tray 81 is slidable on the main tray 8. Short shafts 82 project from a rear edge portion of the main tray 8 in engagement with elongate openings 83 formed in the auxiliary tray 81.

Claws 84, 84 are provided adjacent to a rear edge of the auxiliary tray 81 in a pivotal manner. The main tray 8 is eccentrically coupled to a driving gear 40 on the chassis 1 via a link 48 so as to be moved back and forth by rotation of the driving gear 40.

As shown in FIG. 15A, when the recording medium 7 is loaded onto the main tray 8 and the auxiliary tray 81 at an eject position, the driving gear 40 is rotated to advance the main tray 8. When the short shafts 82 of the main tray 8 abut against front ends of the elongate openings 83 of the auxiliary tray 81, the auxiliary tray 81 is also advanced.

Before the first connector 71 of the recording medium 7 is brought into engagement with the second connector 2 provided on the chassis 1, the claws 84, 84 provided adjacent to the rear edge of the auxiliary tray 81 are inwardly pivoted in abutment against cams 10 provided at rear ends of the chassis 1 thereby to be engaged with a rear edge of the recording medium 7 (FIG. 15B).

With the claws 84, 84 thus engaged with the rear edge of the recording medium 7 for prevention of rearward movement of the recording medium 7 on the trays 8, 81, the trays 8, 81 are advanced. Thus, the first connector 71 of the recording medium 7 and the second connector 8 of the chassis 1 can assuredly be engaged with each other, even if a great engagement resistance occurs between the first and second connectors 71 and 8.

However, the conventional apparatus has the following drawbacks.

1. In the aforesaid recording medium loading operation, the recording medium 7 is loaded onto the trays 8, 81, and then the main tray 8 is advanced to completely take the recording medium 7 into a cabinet of the recorder or player apparatus. Thereafter, the auxiliary tray 81 is advanced to pivot the claws 84, 84 for the prevention of the rearward movement of the recording medium 7. Then, the trays 8, 81 are further advanced, whereby the connectors 71 and 2 are brought into engagement with each other.

Therefore, the stroke of the main tray 8 includes a stroke required for completely take the recording medium 7 into the cabinet (not shown) of the recorder or player apparatus as well as a stroke required for pivoting the claws 84 and a stroke required for engaging the connectors 71 and 2 with each other. Thus, the total stroke of the main tray 8 is increased, so that the loader has a greater length as measured in a tray advancing direction. This makes it impossible to reduce the length of the loader to smaller than the length of the recording medium 7.

2. Since the cams 10 for pivoting the claws 84 are located adjacent to the rear edge of the loader, it is impossible to implement the loader in a recorder or player apparatus which is adapted to use the recording medium 7 in such a state that a rear portion of the recording medium 7 projects out of the loader.

3. Since the main tray 8 and the auxiliary tray 81 are employed in combination, a greater number of components and a greater labor are required for the assembly of the apparatus.

The present invention is directed to a recording medium loader which is free from the aforesaid drawbacks.

SUMMARY OF THE INVENTION

According to the present invention, there is provided a recording medium loader, which comprises: a chassis (1); a single tray (5) provided on the chassis (1) for transporting a generally rectangular planar recording medium (7); a connector (2) provided on the chassis (1) for engagement with the recording medium (7); an engagement piece (6) provided on the tray (5) and having a claw (62) to be brought into and out of engagement with a notch (73) formed in the recording medium (7); and a cam (3) provided on the chassis (1), the cam (3) being engageable with the engagement piece (6) during a period from a time point when the tray (5) starts advancing to a time point when the tray (5) reaches a forward end.

The recording medium (7) is loaded onto the tray (5), and then the tray (5) is advanced. In the midst of the advancement of the tray (5), the engagement piece (6) is operated by the cam (3), whereby the claw (62) of the engagement piece (6) is fitted into the notch (73) of the recording medium (7). Thus, the recording medium (7) is locked on the tray (5) thereby to be prevented from being displaced forward and backward with respect to the tray (5).

While the recording medium (7) is thus prevented from being moved backward with respect to the tray (5), the recording medium (7) is engaged with the connector (2) on the chassis (1) by the advancement of the tray (5). Thus, the recording medium (7) and the connector (2) can assuredly be engaged with each other, even if a great engagement resistance occurs therebetween.

The engagement piece (6) is operated within the stroke of the tray (5) for transporting the recording medium (7), so that the stroke merely required for the operation of the engagement piece (6) is obviated. Therefore, the stroke of the tray (5) can be shortened, whereby the length of the loader can correspondingly be reduced.

The provision of the single tray (5) makes it possible to reduce the number of the components and save the labor required for the assembly of the loader, as compared with the conventional arrangement which employs the major tray (8) and the auxiliary tray (81) in combination.

In the midst of the advancement of the recording medium (7), the engagement piece (6) is engaged with the cam (3) and then with the notch (73) of the recording medium (7).

Therefore, the present invention can be implemented in a recorder or player apparatus of the type in which the recording medium (7) is used with its rear portion projecting out of a cabinet of the apparatus, by shifting the connector (2) rearward on the chassis (1) to shorten the stroke of the tray (5). In this case, even if a wrong attempt is made to withdraw the recording medium (7) projecting from the cabinet, the attempt is failed because the recording medium (7) is locked with the claw (62) of the engagement piece (6) being fitted in the notch (73) of the recording medium (7).

Where the present invention is implemented in a recorder or player apparatus of the type in which the recording medium (7) is completely accommodated in a cabinet thereof for use, the recording medium (7) can be engaged with the connector upon the accommodation of the rear edge of the recording medium (7) in the cabinet of the recorder or player apparatus.

The inventive loader has a smaller length than the conventional loader in which the stroke of the tray includes the stroke required for completely take the recording medium (7) into the loader as well as the stroke required for pivoting at least the claws (84) and the stroke required for bringing the connectors into engagement with each other.

DETAILED DESCRIPTION OF THE PREFERRED EMBODIMENTS

Figure 14:
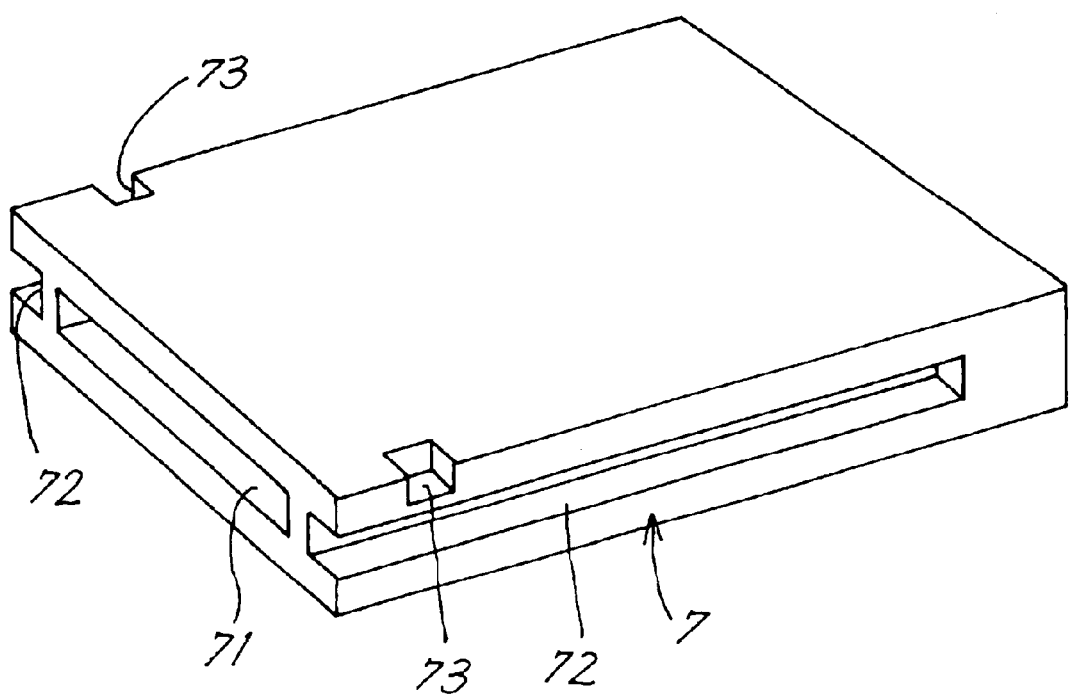
FIG. 14 is a perspective view of a recording medium.
Figure 15A:
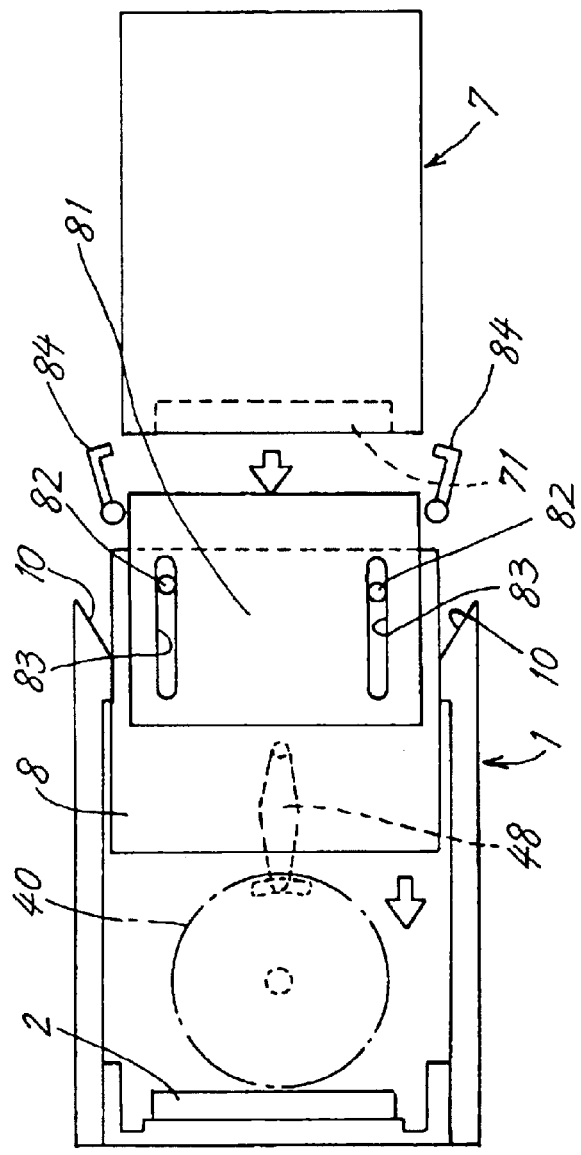
FIG. 15A is a plan view illustrating a conventional loader in an eject state.
Figure 15B:
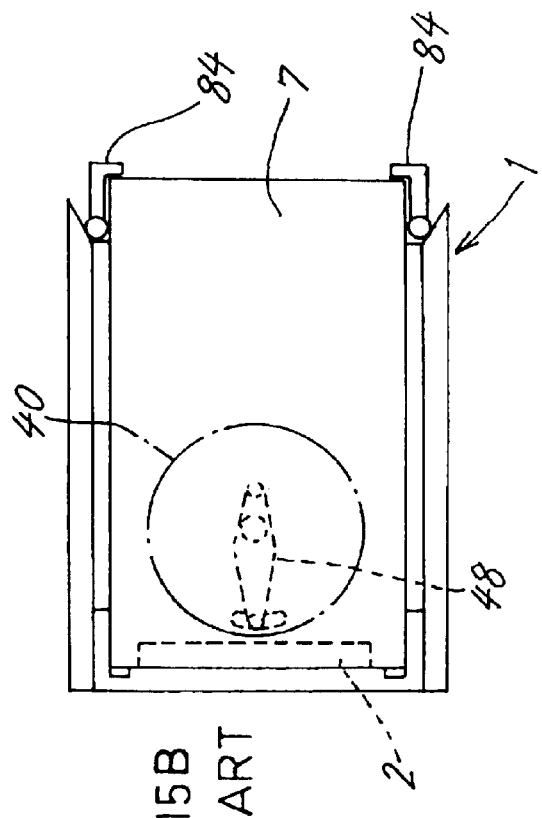
FIG. 15B is a plan view illustrating the conventional loader after completion of a loading operation.

FIG. 14 illustrates a rectangular planar recording medium 7 for recording any information such as visual and audio information. The recording medium 7 includes an elongate first connector 71 provided in a front end face thereof, notches 73 provided adjacent to the front edge thereof, and guide grooves 72, 72 respectively formed in laterally opposite faces thereof. The notches 73 each extend from a lateral face to an upper face of the recording medium 7. The guide grooves each open in the front end face of the recording medium 7 and lengthily extend rearward.

First Embodiment

Loader

Figure 1:
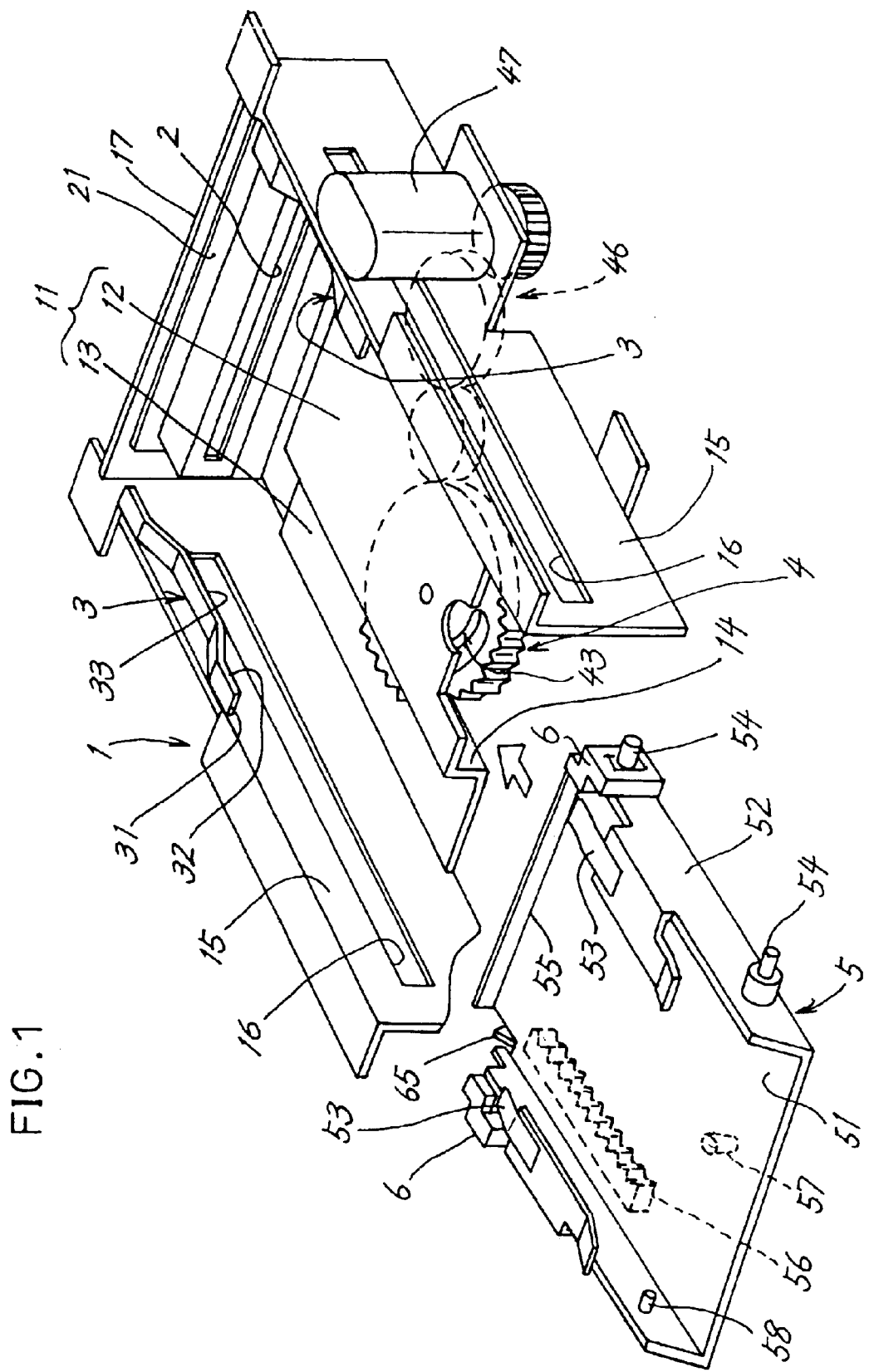
FIG. 1 is a perspective view illustrating an inventive loader with a tray thereof removed from a chassis thereof.
Figure 2:
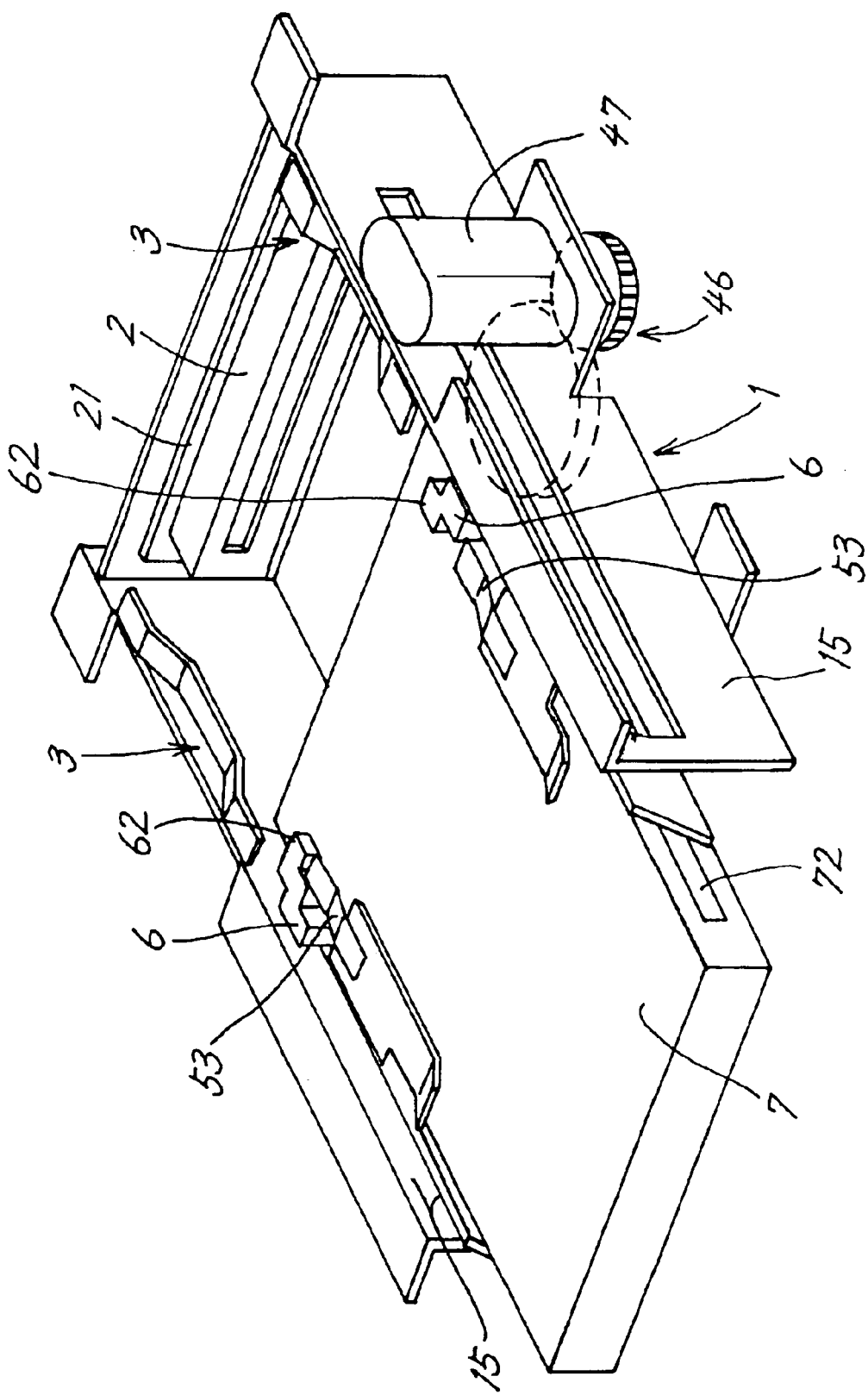
FIG. 2 is a perspective view illustrating the loader with a recording medium loaded therein.

FIG. 1 is an exploded perspective view of a loader, and FIG. 2 is a perspective view illustrating the loader in the midst of a loading operation. The loader includes a chassis 1, which includes a pair of parallel elongate side plates 15, 15 extending anteroposteriorly, and a front plate 17 and a bottom plate 11 linking the side plates 15 and 15. A tray 5 is provided between the side plates 15 and 15 in an anteroposteriorly slidable manner.

The side plates 15, 15 respectively have guide slits 16, 16 formed therein as extending anteroposteriorly for guiding the tray 5. A circuit board 21 and a second connector 2 to be engaged with the first connector 71 of the recording medium 7 are provided on an interior surface of the front plate 17 of the chassis 1.

The bottom plate 11 of the chassis 1 has a step. A tray driving gear 4 is provided on a lower surface of a higher level portion 12 of the bottom plate 11. The tray driving gear 4 is coupled to a motor 47 via a reduction gear series 46.

The driving gear 4 partly projects over a lower level portion 13 of the bottom plate 11 through a boundary plate 14 between the higher level portion 12 and the lower level portion 13.

The tray 5 includes a bottom plate 51 on which the recording medium 7 is placed, and side walls 52, 52 projecting upright from opposite edges of the bottom plate 51. Guide shafts 54, 54 project outward from anteroposteriorly opposite end portions of the side walls 52, and are fitted in the guide slits 16 of the side plates 15 of the chassis in a slidable manner.

Projection shafts 58 to be fitted in the guide grooves 72 of the recording medium 7 respectively project from interior surfaces of the side walls 52. A stopper 55 to be brought into abutment against a forward edge of the recording medium 7 is provided on a front edge of the bottom plate 51.

A rack 56 to be meshed with the driving gear 4 on the chassis 1 and a shaft piece 57 to be engaged with a cam groove 43 of the driving gear 4 to be described later project from a lower surface of the bottom plate 51.

Leaf springs 53, 53 for pressing the upper surface of the recording medium 7 are respectively provided on upper edge portions of the side walls 52.

Figure 4:
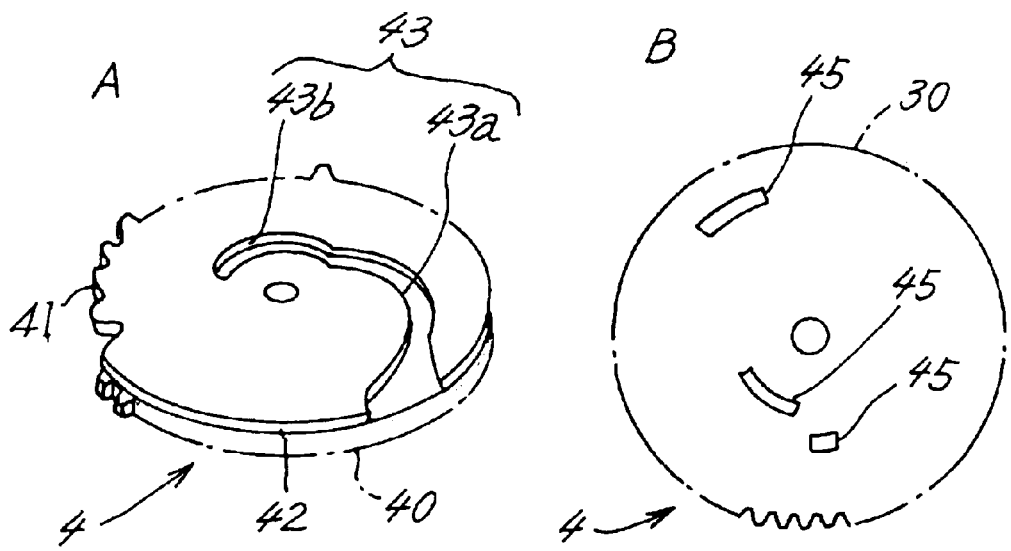
FIGS. 4A and 4B are a perspective view and a bottom view, respectively, of a driving gear.

FIG. 4A is a perspective view illustrating the driving gear 4 as viewed from the upper side, and FIG. 4B is a bottom view of the driving gear 4. The driving gear 4 has two stages provided along its thickness. A lower stage has a toothed surface 40, which is meshed with the reduction gear series 46. A higher stage has a cylindrical portion 42 having substantially the same diameter as the pitch circle of the toothed surface 40 and a toothed surface 41 meshed with the rack 56. The driving gear 4 has the cam groove 43 formed in an upper surface thereof and having an end which opens to the outer periphery of the driving gear 4. The cam groove 43 includes a driving cam surface 43a arcuately curved to gradually approach the rotation center of the driving gear 4 from the open end, and an arcuate stationary cam surface 43b provided on a terminal side and having a radius about the rotation center of the driving gear 4.

Projection pieces 45, 45, 45 are provided on a rear surface of the driving gear 4. The projection pieces 45 press down a detection switch (not shown) provided below the driving gear 4 according to the rotation angle of the driving gear 4 to detect an eject state where the recording medium 7 is ejected from the tray 5 and an insertion-completed state where the recording medium 7 is engaged with the second connector 2.

The rotation of the driving gear 4 advances the rack 56 meshed with the gear 4 (i.e., the tray 5) at a higher speed. When the rack 56 is disengaged from the driving gear 4, the shaft piece 57 of the tray 5 is fitted in the cam groove 43 to advance the tray 5 at a lower speed.

One feature of the present invention is that engagement pieces 6 are provided on the tray 5 and cams 3 to be brought into and out of engagement with the engagement pieces 6 are provided on the chassis 1.

The tray 5 is advanced from an eject position, and the engagement pieces 6 are operated by the cams 3 before the first connector 71 of the recording medium 7 is engaged with the second connector 2 on the chassis 1. The engagement pieces 6 are engaged with the notches 73 of the recording medium 7 to fixedly lock the recording medium 7 on the tray 5. In this state, the first connector 71 and the second connector 2 are brought into engagement with each other.

Figure 3:
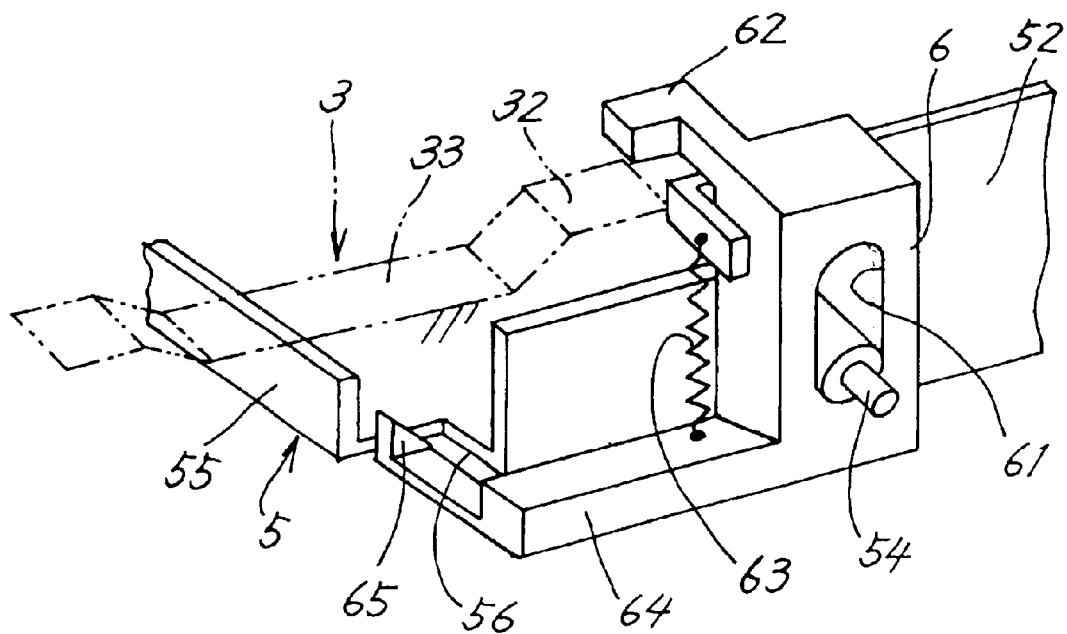
FIG. 3 is a perspective view illustrating how an engagement piece is mounted as seen in an arrow direction F in FIG. 1.

As shown in FIG. 3, the engagement pieces 6 are vertically elongated blocks, which are respectively provided at front ends of the side walls 52 of the tray 5 in a vertically movable manner (i.e., slidably along the thickness of the recording medium 7 on the tray).

The engagement pieces 6 each have a vertically elongated hole 61. The guide shafts 54 respectively projecting from front end portions of the side walls 52 of the tray are fitted in the elongated holes 61, and are respectively supported by guide walls (not shown) in an only vertically movable manner. The engagement pieces 6 are respectively biased upward by springs 63.

Claws 62 to be brought into and out of engagement with the notches 73 of the recording medium 7 respectively project from upper ends of the engagement pieces 6 along a tray movement path.

L-shaped arms 64 respectively project forward from lower ends of the engagement pieces 6. Detection pieces 65 respectively project upward from distal ends of the arms and are exposed in the tray 5 through cut-away portions formed in a front upper edge of the tray 5.

The cams 3 to be brought into and out of engagement with the engagement pieces 6 are provided on front upper edge portions of the side plates 15, 15 of the chassis 1 as extending along the tray movement path.

The cams 3 each include a rear horizontal mount portion 32 which is gradually lowered to be continued forward to a front horizontal trough portion 33.

Just before the tray 5 reaches a forward end, i.e., just before the first connector 71 of the recording medium 7 is brought into engagement with the second connector 2 on the chassis 1, the upper ends of the engagement pieces 6 on the tray 5 are squeezed under the horizontal trough portions 33 of the cams 3.

When the recording medium 7 is correctly loaded on the tray 5, the recording medium 7 presses down the detection pieces 65 to lower the engagement pieces 6. Thus, the upper ends of the engagement pieces 6 are permitted to go under the horizontal mount portions 32 of the cams 3.

When the tray 5 is squeezed in by a hand without the recording medium 7 loaded on the tray 5, the upper portions of the engagement pieces 6 abut against stoppers 31 at rear ends of the cams 3. Thus, the tray 5 is prevented from being further squeezed.

When the engagement pieces 6 reach the horizontal trough portions 33 of the cams 3, the engagement pieces 6 are further pressed down, whereby the claws 62 of the engagement pieces 6 are fitted in the notches 73 of the recording medium 7 to lock the recording medium 7 on the tray 5.

For smooth engagement of the claws 62 with the notches 73 and accommodation of an offset of the recording medium 7 loaded on the tray 5, this embodiment is designed so that the claws 62 are fitted in the notches 73 with small forward and rearward clearances. Even in this case, when the connectors 71 and 2 are engaged with each other, the clearances between the claws 62 and the notches 73 are eliminated by an engagement resistance occurring between the connectors 71 and 2, so that a force for moving the tray can assuredly be transmitted to the recording medium 7 via the claws 62 and the notches 73.

Recording Medium Loading Operation

Figure 5:
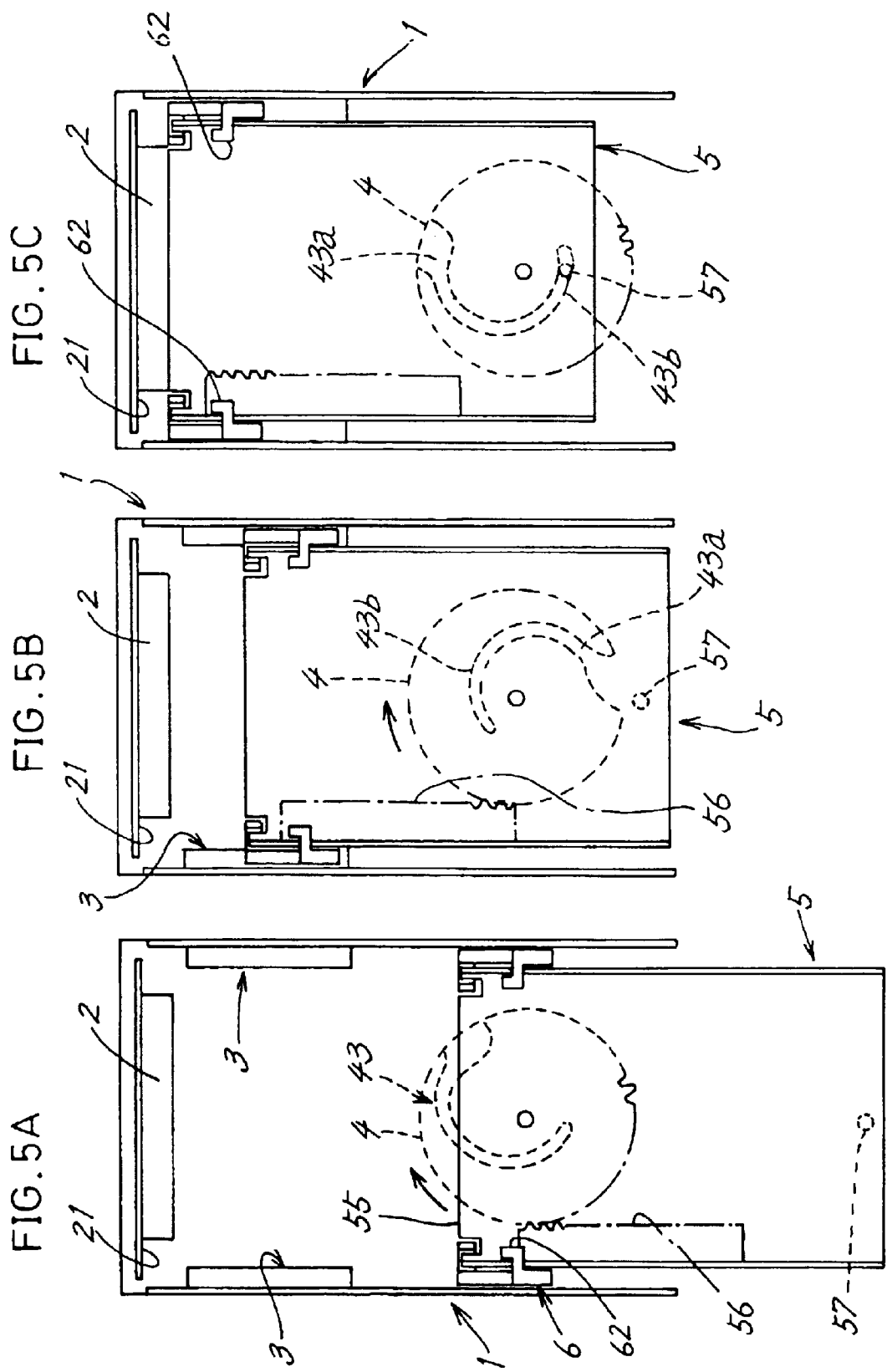
FIG. 5A is a plan view illustrating the loader in an eject state.
FIG. 5B is a plan view illustrating the loader in the midst of a loading operation.
FIG. 5C is a plan view illustrating the loader after completion of the loading operation.

FIGS. 5A to 5C are plan views illustrating how the driving gear 4 and the tray 5 operate from the eject state to the insertion-completed state. For convenience of explanation, the recording medium 7 is not shown in FIGS. 5A to 5C.

When the recording medium 7 is inserted in the tray 5 in the eject state shown in FIG. 5A, the projection shafts 58 of the tray 5 are fitted in the guide grooves 72 of the recording medium 7 (see FIG. 14), whereby the recording medium 7 is advanced straight on the tray 5 and stopped in abutment against the stopper 55.

As described above, the recording medium 7 presses down the detection pieces 65 to lower the engagement pieces 6. Further, the recording medium 7 presses an insertion detection switch (not shown) provided on the tray 5, whereby the motor 47 is energized. The energization of the motor 47 causes the driving gear 4 to rotate clockwise, whereby the rack 56 meshed with the driving gear 4 is advanced. That is, the tray 5 is advanced at a higher speed.

Because the engagement pieces 6 have been lowered, the engagement pieces 6 are squeezed under the horizontal mount portions 32 of the cams 3 without colliding against the stoppers 31 provided at the rear ends of the cams 3 on the chassis 1.

As shown in FIG. 5B, when the rack 56 is brought out of meshing engagement with the driving gear 4 by the advancement of the tray 5, the shaft piece 57 is fitted in the cam groove 43 of the driving gear 4, whereby the tray 5 is further advanced at a lower speed. At this time, the engagement pieces 6 on the tray 5 are further pressed down by the horizontal trough portions 33 of the cams 3 on the chassis 1. Thus, the claws 62 of the engagement pieces 6 are tightly fitted in the notches 73 of the recording medium 7, whereby the recording medium 7 is locked on the tray 5.

The advancement of the tray 5 causes the first connector 71 of the recording medium 7 to be engaged with the second connector 2 on the chassis 1.

When the connectors 71, 2 are brought into engagement with each other, a load required for moving the tray 5 is increased by the engagement resistance. However, the shaft piece 57 is fitted in the arcuate cam groove 43 of the driving gear 4 and has a smaller pressure angle with respect to the cam groove 43, so that the tray 5 is advanced by a greater force. Therefore, the connectors 71, 2 can easily and assuredly be brought into engagement with each other.

As described above, the single driving gear 4 can switchably perform the recording medium moving operations to quickly move the recording medium 7 with a smaller load and to slowly move the recording medium 7 with a greater force. Thus, the recording medium loading operation can properly be performed according to the load required for the transport of the recording medium 7. If the cam groove 43 alone was utilized for the movement of the tray 5, it would be impossible to increase the movement stroke of the tray 5 to greater than the radius of the driving gear 4. In this embodiment, however, the toothed surface 46 and the cam groove 43 are utilized for driving the tray 5, so that the stroke of the tray for transporting the recording medium 7 can be increased.

An unloading operation is performed in a reverse order to the loading operation.

Second Embodiment

Figure 6:
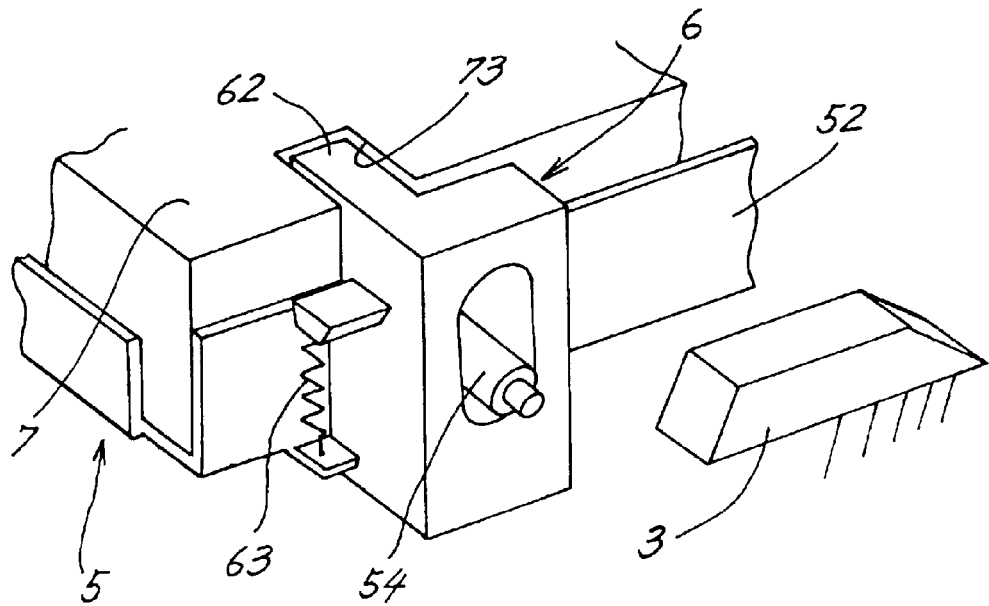
FIG. 6 is a perspective view illustrating an engagement piece and its surroundings according to a second embodiment.

An embodiment shown in FIG. 6 is a variation of the first embodiment. Engagement pieces 6 are vertically slidable, and the detection pieces 65 employed in the first embodiment are omitted. In contrast to the first embodiment, the engagement pieces 6 are biased downward toward the notches 73 of the recording medium 7 on the tray 5 by springs 63.

Cams 3 for sliding the engagement pieces 6 upward before the tray 5 reaches the rearward end (at the eject position) are provided on the chassis 1.

In an eject operation, the engagement pieces 6 are slid upward against the springs 63 by the cams 3, whereby claws 62 of the engagement pieces 6 are disengaged from the notches 73 of the recording medium 7. Thus, the recording medium 7 can freely be taken in and out of the tray 5.

In the midst of the advancement of the tray 5, the engagement pieces 6 are disengaged from the cams 3, and lowered by the spring forces. Thus, the claws 62 are fitted in the notches 73 of the recording medium 7 to lock the recording medium 7 on the tray 5.

Third Embodiment

Figure 7:
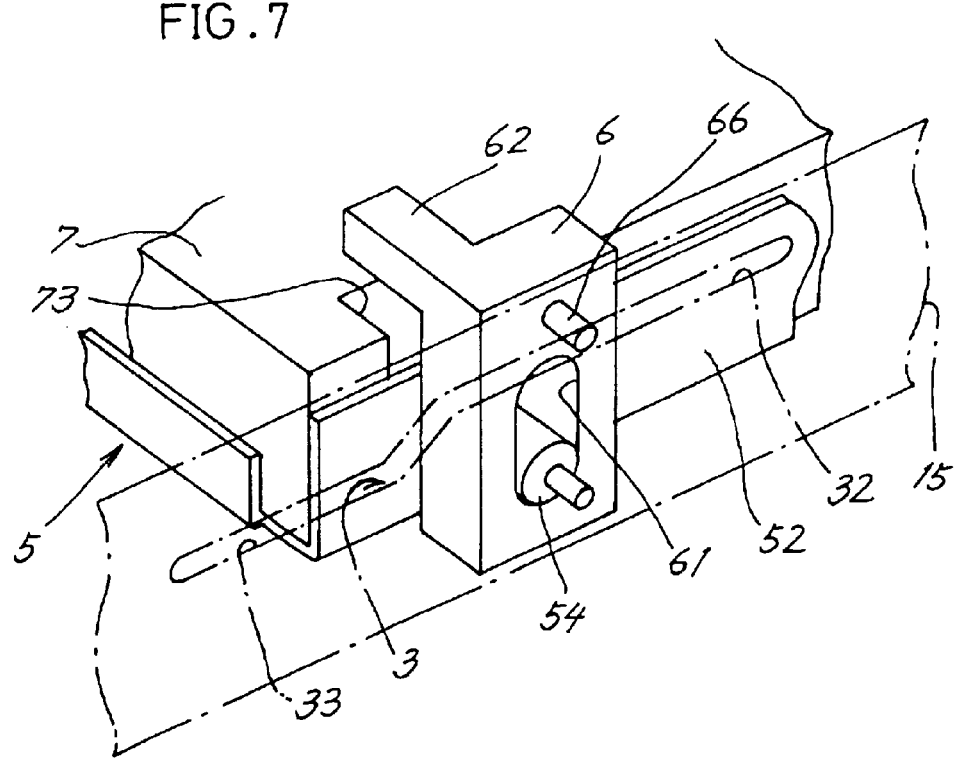
FIG. 7 is a perspective view illustrating an engagement piece and its surroundings according to a third embodiment.

An embodiment shown in FIG. 7 is a variation of the first embodiment. Engagement pieces 6 are vertically slidable, and the springs 63 for biasing the engagement pieces 6 and the detection pieces 65 employed in the first embodiment are omitted.

Groove cams 3 for vertically sliding the engagement pieces 6 are provided in the side plates 15 of the chassis 1. Shafts 66 respectively project form the engagement pieces 6, and are slidably fitted in the groove cams 3.

In the eject operation, the shafts 66 reach mount portions 32 of the groove cams 3, whereby the engagement pieces 6 are slid upward. Thus, claws 62 of the engagement pieces 6 are disengaged from the notches 73, so that the recording medium 7 can freely be taken in and out of the tray 5.

When the tray 5 is advanced, the shafts 66 reach trough portions 33 of the groove cams 3, whereby the engagement pieces 6 are slid downward. Thus, the claws 62 are fitted in the notches 73, so that the recording medium 7 is locked on the tray 5.

Fourth Embodiment

Figure 8:
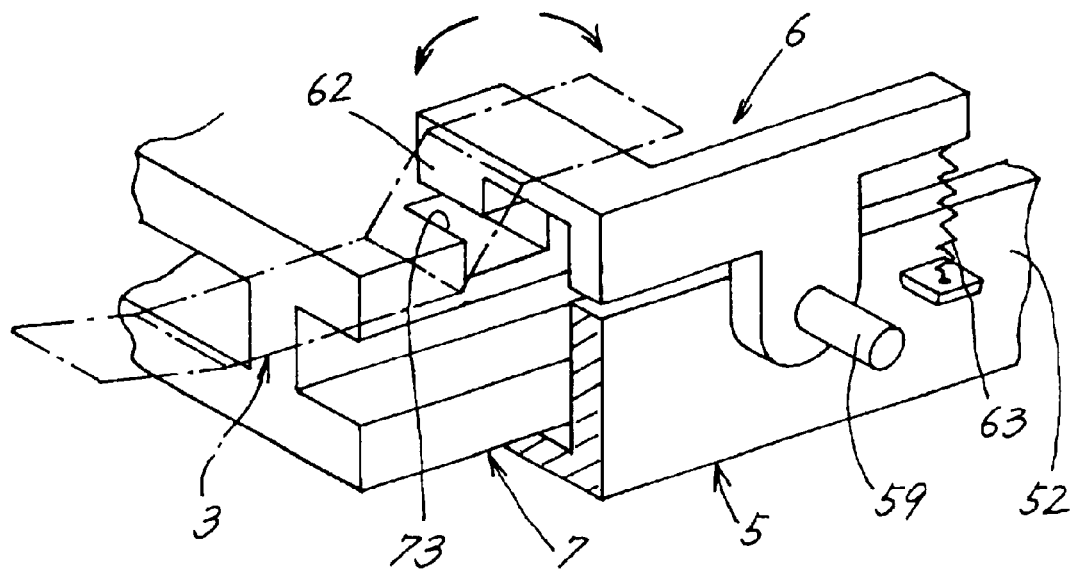
FIG. 8 is a perspective view illustrating an engagement piece and its surroundings according to a fourth embodiment.

FIG. 8 illustrates another embodiment of the present invention, in which engagement pieces 6 are respectively attached to the side walls 52 of the tray 5 and pivotal within planes parallel to the side walls 52.

The engagement pieces 6 are respectively attached to the side walls 52 of the tray 5 pivotally by support shafts 59, and claws 62 to be brought into and out of engagement with the notches 73 of the recording medium 7 are respectively provided at free ends of the engagement pieces 6.

The engagement pieces 6 are biased by springs 63 in such a direction that the claws 62 are moved away from the notches 73 of the recording medium 7 on the tray 5.

As in the first embodiment, the engagement pieces 6 are brought into engagement with the cams 3 on the chassis 1 in the midst of the advancement of the tray 5 thereby to be pivoted against the springs 63. Thus, the claws 62 are fitted in the notches 73 of the recording medium 7 to lock the recording medium 7 on the tray 5.

Fifth Embodiment

Figure 9:
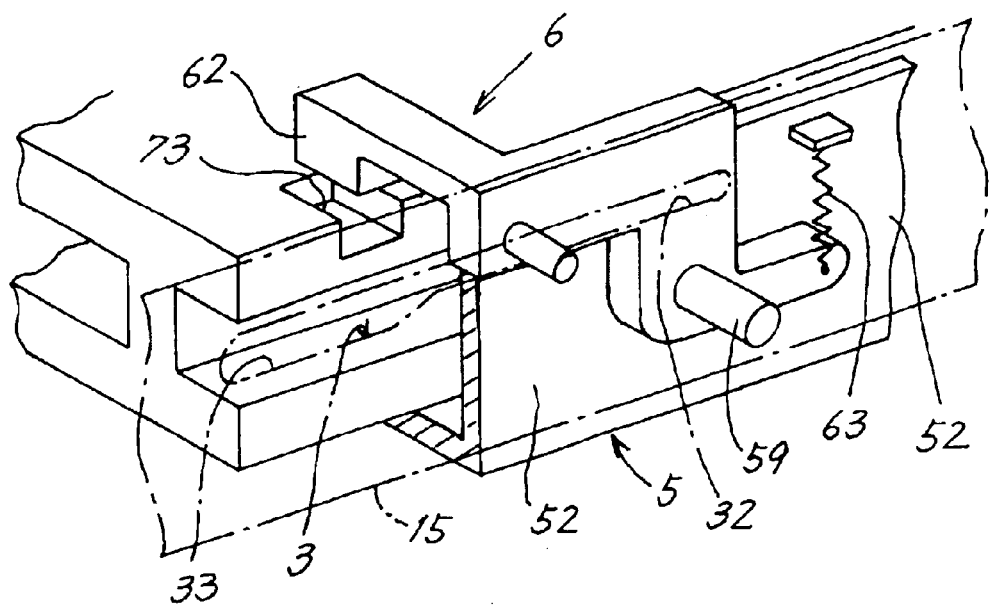
FIG. 9 is a perspective view illustrating an engagement piece and its surroundings according to a fifth embodiment.

FIG. 9 illustrates a variation of the fourth embodiment. In contrast to the fourth embodiment, engagement pieces 6 are biased by springs 63 in such a direction that claws 62 thereof are brought into engagement with the notches 73 of the recording medium 7 on the tray 5.

Groove cams 3 for pivoting the engagement pieces 6 up and down are respectively provided in the side plates 15 of the chassis 1. Shafts 66 to be fitted in the groove cams 3 respectively project from the engagement pieces 6.

In the eject operation, the shafts 66 reach mount portions 32 of the groove cams 3, whereby the engagement pieces 6 are slid upward. Thus, the claws 62 are disengaged from the notches 73, so that the recording medium 7 can freely be taken in and out of the tray 5.

When the tray 5 is advanced, the shafts 66 reach trough portions 33 of the groove cams 3, whereby the engagement pieces 6 are slid downward. Thus, the claws 62 are fitted in the notches 73, so that the recording medium 7 is locked on the tray 5.

Sixth Embodiment

Figure 10:
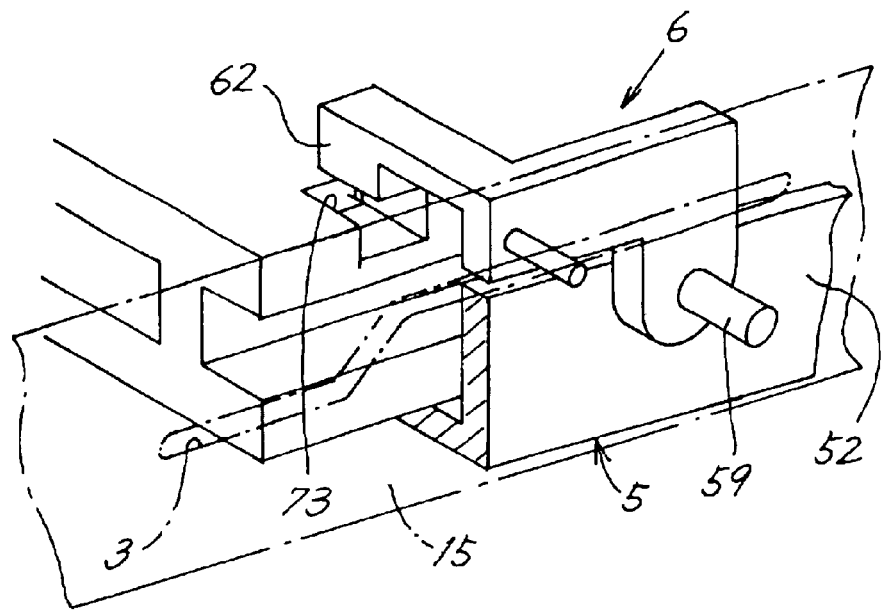
FIG. 10 is a perspective view illustrating an engagement piece and its surroundings according to a sixth embodiment.

FIG. 10 illustrates a variation of the fifth embodiment. The springs 63 for biasing the engagement pieces 6 are omitted, so that the movement of the engagement pieces 6 is controlled by the groove cams 3 alone in the same manner as in the fifth embodiment.

Seventh Embodiment

Figure 11:
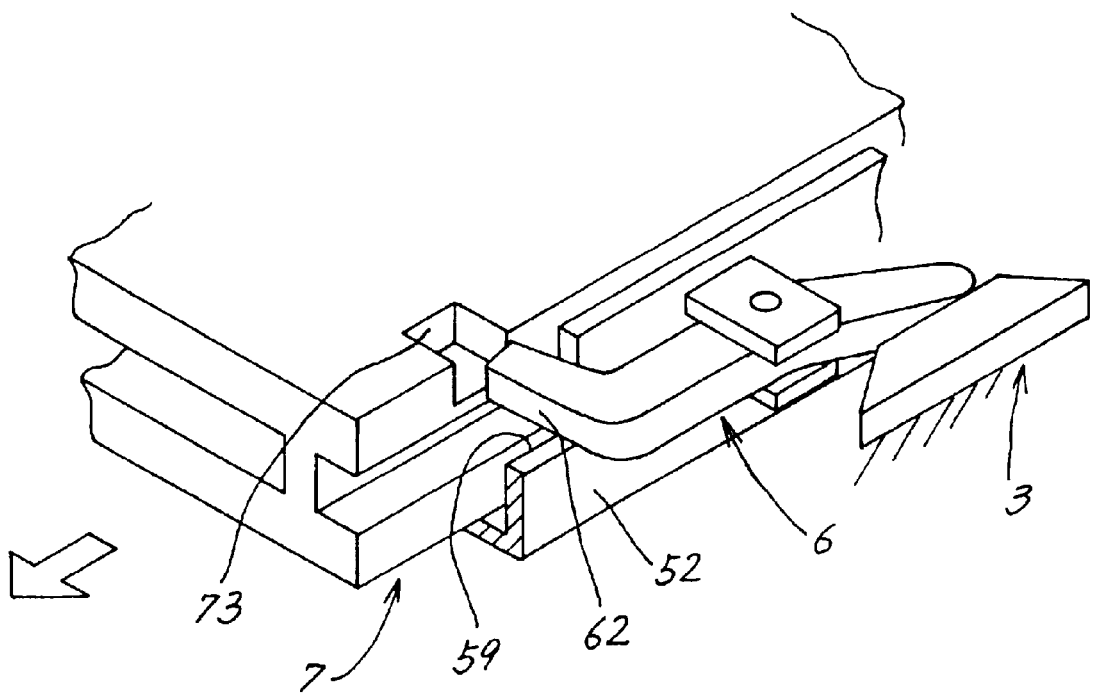
FIG. 11 is a perspective view illustrating an engagement piece and its surroundings according to a seventh embodiment.

FIG. 11 illustrates further another embodiment of the present invention, in which engagement pieces 6 are brought into engagement with the notches 73 of the recording medium 7 from lateral sides.

The engagement pieces 6 are respectively attached to the side walls 52 of the tray 5, and are pivotal within a horizontal plane. The engagement pieces 6 respectively include claws 62 provided at free ends thereof to be brought into and out of engagement with the notches 73 of the recording medium 7. The engagement pieces 6 are biased by springs (not shown) such as torsion springs in such directions that the claws 62 are engaged with the notches 73.

The side walls 52 of the tray 5 respectively have openings 59 through which the claws 62 of the engagement pieces 6 are advanced and retracted.

Cams 3 for operating the engagement pieces 6 before the tray 5 reaches the rearward end (at the eject position) are provided on the chassis 1.

In the eject operation, the engagement pieces 6 are pivoted by the cams 3 in such directions that the claws 62 are disengaged from the notches 73. Thus, the recording medium 7 can freely be taken in and out of the tray 5.

In the midst of the advancement of the tray 5, the engagement pieces 6 are disengaged from the cams 3 on the chassis 1. Then, the engagement pieces 6 are pivoted by the spring forces, whereby the claws 62 are fitted in the notches 73 of the recording medium 7 to lock the recording medium 7 on the tray 5.

Eighth Embodiment

Figure 12:
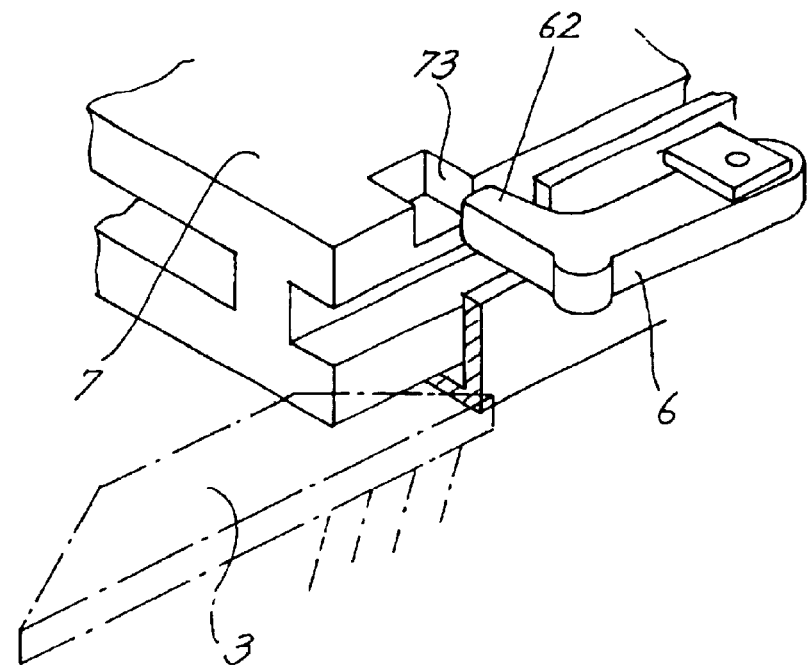
FIG. 12 is a perspective view illustrating an engagement piece and its surroundings according to an eighth embodiment.

FIG. 12 illustrates a variation of the embodiment shown in FIG. 11. In contract to the embodiment shown in FIG. 11, engagement pieces 6 are biased by springs (not shown) in such directions that claws 62 thereof are moved away from the notches 73.

Cams 3 for operating the engagement pieces 6 against the springs before the tray 5 reaches the forward end are provided on the chassis 1.

In the eject operation, the engagement pieces 6 are disengaged from the cams 3 thereby to be pivoted by the spring forces in such directions that the claws 62 are disengaged from the notches 73. Thus, the recording medium 7 can freely be taken into and out of the tray 5.

In the midst of the advancement of the tray 5, the free ends of the engagement pieces 6 are engaged with the cams 3 on the chassis 1 thereby to be pivoted against the spring forces. Thus, the claws 62 are fitted in the notches 73 of the recording medium 7 to lock the recording medium 7 on the tray 5.

Ninth Embodiment

Figure 13:
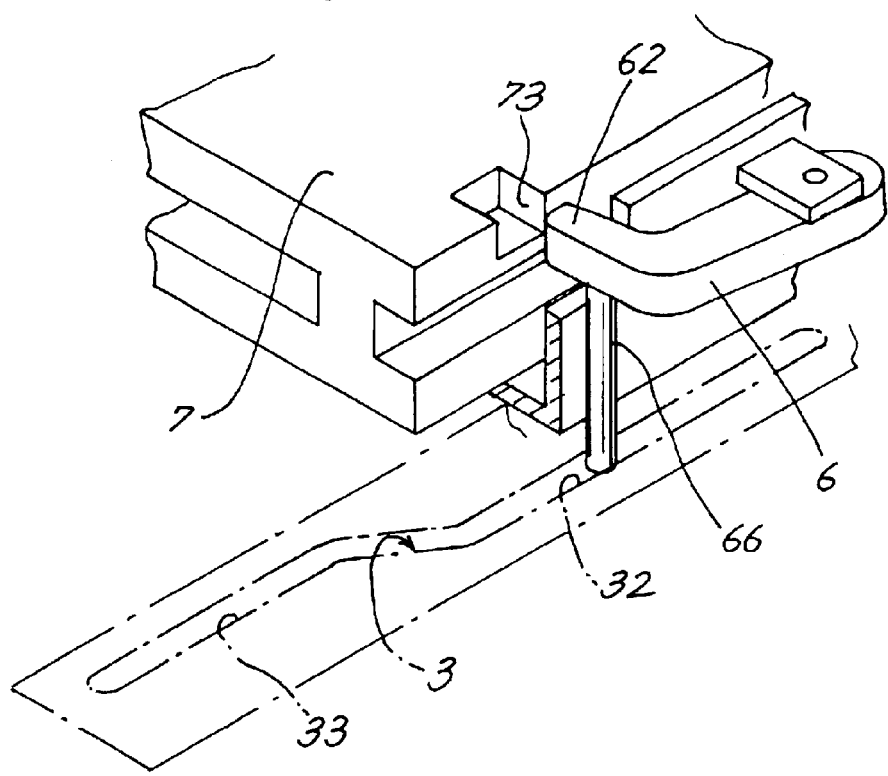
FIG. 13 is a perspective view illustrating an engagement piece and its surroundings according to a ninth embodiment.

FIG. 13 illustrates another variation of the embodiment shown in FIG. 11. The springs for biasing the engagement pieces 6 are omitted.

Cam grooves 3 are provided in an upper surface of the chassis within planes parallel to pivot planes of the engagement pieces 6. Shafts 66 respectively project from the engagement pieces 6 in sliding engagement with the cam grooves 3.

In the eject operation, the shafts 66 reach mount portions 32 of the groove cams 3, whereby the engagement pieces 6 are pivoted outward. Thus, the claws 62 are disengaged from the notches 73, so that the recording medium 7 can freely be taken in and out of the tray 5.

When the tray 5 is advanced, the shafts 66 reach trough portions 33 of the groove cams 3, whereby the engagement pieces 6 are pivoted inward. Thus, the claws 62 are fitted in the notches 73, so that the recording medium 7 is locked on the tray 5.

Where the recording medium 7 is loaded onto the tray 5 with the notches thereof directed downward in the embodiments shown in FIGS. 6 to 10, the engagement pieces 6 may be designed so that the claws 62 are brought into and out of engagement with the notches 73 from the lower side.

What is claimed is:

1. A recording medium loader comprising:
   a chassis;
   a single tray provided on the chassis for transporting a generally rectangular planar recording medium;
   a connector provided on the chassis for engagement with the recording medium;
   an engagement piece provided on the tray and having a claw to be brought into and out of engagement with a notch formed in the recording medium; and
   a cam provided on the chassis, the cam being engageable with the engagement piece during a period from a time point when the tray starts advancing to a time point when the tray reaches a forward end,
   wherein the engagement piece is operated by the cam to engage the claw with the notch of the recording medium before a forward edge of the recording medium is brought into engagement with the connector, whereby the recording medium is locked on the tray.

2. A recording medium loader as set forth in claim 1,
   wherein the notch is provided in one of upper and lower surfaces of the recording medium,
   wherein the engagement piece is slidable in a thickness direction of the recording medium.

3. A recording medium loader as set forth in claim 1,
   wherein the notch is provided in one of upper and lower surfaces of the recording medium,
   wherein the engagement piece is slidable in a thickness direction of the recording medium,
   wherein the engagement piece is biased by a spring in such a direction that the claw thereof is moved away from the notch of the recording medium on the tray.

4. A recording medium loader as set forth in claim 1,
   wherein the notch is provided in one of upper and lower surfaces of the recording medium,
   wherein the engagement piece is slidable in a thickness direction of the recording medium,
   wherein the engagement piece is biased by a spring in such a direction that the claw thereof is moved toward the notch of the recording medium on the tray.

5. A recording medium loader as set forth in claim 1,
   wherein the notch is provided in one of upper and lower surfaces of the recording medium,
   wherein the engagement piece is pivotal within a plane parallel to a side surface of the recording medium.

6. A recording medium loader as set forth in claim 1,
   wherein the notch is provided in one of upper and lower surfaces of the recording medium,
   wherein the engagement piece is pivotal within a plane parallel to a side surface of the recording medium,
   wherein the engagement piece is biased by a spring in such a direction that the claw thereof is moved away from the notch of the recording medium on the tray.

7. A recording medium loader as set forth in claim 1,
   wherein the notch is provided in one of upper and lower surfaces of the recording medium,
   wherein the engagement piece is pivotal within a plane parallel to a side surface of the recording medium,
   wherein the engagement piece is biased by a spring in such a direction that the claw thereof is moved toward the notch of the recording medium on the tray.

8. A recording medium loader as set forth in claim 1,
   wherein the notch is provided in a side surface of the recording medium,
   wherein the engagement piece is pivotal within a plane parallel to upper and lower surfaces of the recording medium.

9. A recording medium loader as set forth in claim 1,
   wherein the notch is provided in a side surface of the recording medium,
   wherein the engagement piece is pivotal within a plane parallel to upper and lower surfaces of the recording medium,
   wherein the engagement piece is biased by a spring in such a direction that the claw thereof is moved toward the notch of the recording medium on the tray.

10. A recording medium loader as set forth in claim 1,
    wherein the notch is provided in a side surface of the recording medium,
    wherein the engagement piece is pivotal within a plane parallel to upper and lower surfaces of the recording medium,
    wherein the engagement piece is biased by a spring in such a direction that the claw thereof is moved away from the notch of the recording medium on the tray.

11. A recording medium loader as set forth in claim 3,
    wherein the engagement piece includes a detection piece projecting upward through a bottom of the tray,
    wherein the chassis includes a stopper which is brought into abutment against the engagement piece when a loading operation is performed with the tray being empty,
    wherein the engagement piece is lowered to evade the stopper by depressing the detection piece when the recording medium is loaded on the tray.

* * * * *